J. B. Coffman.
Churn.

N°. 86,002. Patented Jan. 19, 1869.

Witnesses:
Jas. H. Layman
William Bauer

Inventor:
J. B. Coffman
By Knight & Bro
Attys.

JOHN B. COFFMAN, OF NEW RICHMOND, ASSIGNOR TO HIMSELF, ROBERT B. WILSON, AND HENRY B. SINKS, OF CINCINNATI, OHIO.

Letters Patent No. 86,002, dated January 19, 1869.

IMPROVEMENT IN CHURNS.

The Schedule referred to in these Letters Patent and making part of the same.

*To all whom it may concern:*

Be it known that I, JOHN B. COFFMAN, of New Richmond, Clermont county, and State of Ohio, have invented a certain new and useful Improvement in Churns; and do hereby declare the following to be a full, clear, and exact description thereof, reference being had to the accompanying drawings, making part of this specification.

My invention relates to that class of implements known as horizontal-acting churns; and My improvement consists in arranging the dashers in such a manner as to effect the most thorough and complete agitation of the cream, thereby producing a superior article of butter in a few minutes, and with the least possible amount of exertion.

In the accompanying drawings—

Figure 1:
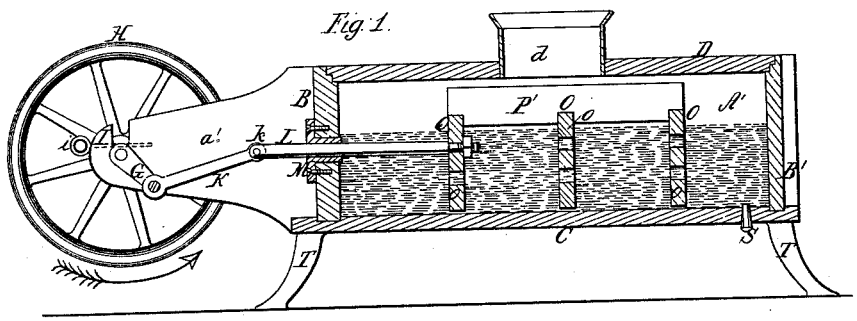
Figure 1 is a longitudinal section of a churn, embodying my improvement.
Figure 2:
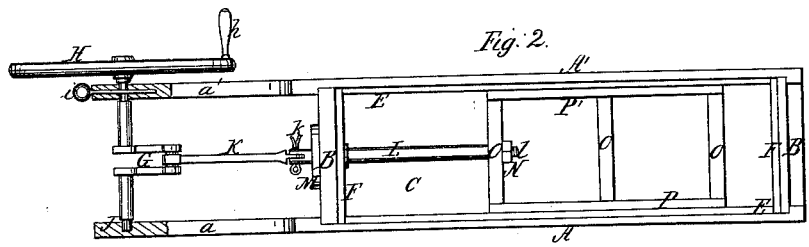
Figure 2 is a plan of the same, with the lid removed.
Figure 3:
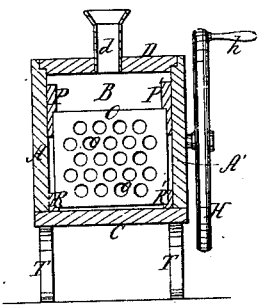
Figure 3 is a transverse section of the churn.

The cream-chamber consists of a long rectangular box, having sides, A A', ends, B B', bottom, C, and a removable lid, D, the latter fitting snugly within the rebates, E and F, of said sides and ends of the chamber.

The sides of this chamber are prolonged, as shown at a a', so as to afford journal-bearings for the crank-shaft G, which has, secured to one end of it, a fly-wheel, H, having a handle, h, by which it is operated.

One end of this shaft fits within the notch I, and is retained therein by a pin, i, while the other end of said shaft revolves within a bearing, J.

The crank-shaft G has connected to it one end of a pitman, K, whose other end is attached to the piston-rod L by means of a spring-pin, k, and said piston-rod plays within a bush, M, that is secured to the end, B, of the cream-chamber.

The inner end of this piston-rod is provided with a screw-threaded portion, l, and a nut, N, which permit of said rod being readily connected to or detached from the dasher.

The dashers consist of two or more heads, O, having a number of perforations, o, and these heads are united at the top by two cleats, P P', and at the bottom by two similar cleats, R R'.

These perforated heads are so large as almost to touch the sides and bottom of the cream-chamber, but a sufficient space is left between the top of said heads and the lid, to permit a free circulation of the cream from one end to the other of the chamber.

The lid of the churn is provided with a tube, d, for the purpose of admitting air to the cream-chamber.

S is a removable plug, which permits of the contents of the cream-chamber being drawn off.

The churn is supported, a suitable distance above the floor, upon legs T.

To operate my churn it is only necessary to pour in the cream, and then rotate the fly-wheel in either direction, by which means a rapid reciprocating movement is imparted to the dashers.

This reciprocation of the dashers causes a violent surging of the cream from one end of the chamber to the other, by which a portion of the cream is forced through the perforations o, and compressed between the heads and ends of the chamber, while other portions, by the action of the dashers against the ends, are projected violently from end to end, over the tops of the dashers, in the form of spray, thereby causing butter to form in a few minutes.

As the cream surges backward and forward within the chamber, it is constantly drawing down a supply of air through the tube d, which facilitates the formation of the butter.

It will be seen that the different parts of my churn can be readily taken apart for the purpose of cleaning or transportation, and it is so simple in its construction, and so easily operated, that a child can work it without becoming fatigued.

In the drawings, the dasher is shown as being composed of three perforated heads, but it is evident that a greater or less number of these can be employed, if desired.

I claim herein as new, and of my invention—

The arrangement, substantially as described, of the cream-chamber A A', a a', B B', C D, crank-shaft G, fly-wheel H h, bearings I J, pitman K, piston-rod L l N, bushing M, and perforated dashers O o, P P', R R', as and for the purpose set forth.

In testimony of which invention, I hereunto set my hand.

JOHN B. COFFMAN.

Witnesses:
GEO. H. KNIGHT,
JAMES H. LAYMAN.